US006125691A

United States Patent [19]

Hohner et al.

[11] Patent Number: 6,125,691

[45] Date of Patent: Oct. 3, 2000

[54] METHOD FOR DETERMINING AN OPERATING PARAMETER OF AN INTERNAL COMBUSTION ENGINE

[75] Inventors: Peter Hohner, Leinfelden-Echterdingen; Jürgen Schenk, Albershausen; Hartung Wilstermann, Gaildorf, all of Germany

[73] Assignee: Daimler-Benz Aktiengesellschaft, Stuttgart, Germany

[21] Appl. No.: 09/134,485

[22] Filed: Aug. 14, 1998

[30] Foreign Application Priority Data

Aug. 16, 1997 [DE] Germany ........................... 197 35 454

[51] Int. Cl.[7] .................................................... G01M 15/00

[52] U.S. Cl. ........................................... 73/35.08; 73/117.3

[58] Field of Search ................................ 73/35.07, 35.08, 73/116, 117.2, 117.3, 118.1; 324/378, 380

[56] References Cited

U.S. PATENT DOCUMENTS

| | | | |
|---|---|---|---|
| 4,762,106 | 8/1988 | Blauhut | 73/35.08 |
| 5,929,322 | 7/1999 | Aoki et al. | 73/35.08 |
| 5,955,664 | 9/1999 | Aoki et al. | 73/35.08 |

FOREIGN PATENT DOCUMENTS

| | | |
|---|---|---|
| 35 06 114 | 9/1986 | Germany . |
| 40 37 943 | 6/1992 | Germany . |
| 42 39 592 | 5/1993 | Germany . |
| 196 80 104 | 5/1997 | Germany . |
| 196 47 161 | 12/1997 | Germany . |
| 7-293315 | 11/1995 | Japan . |

*Primary Examiner*—Eric S. McCall
*Attorney, Agent, or Firm*—Kenyon & Kenyon

[57] ABSTRACT

A method for determining an operating parameter of an internal combustion engine. An ionic current signal curve at a spark plug of the internal combustion engine is measured for a number of ignitions as a function of time. The measured signal curves are then averaged to obtain an averaged signal curve. A maximum and/or the time of the maximum of the averaged signal curve is determined. Based on the maximum of the average signal curve and/or the time of the maximum of the average signal curve, the operating parameter is calculated.

4 Claims, 1 Drawing Sheet

METHOD FOR DETERMINING AN OPERATING PARAMETER OF AN INTERNAL COMBUSTION ENGINE

FIELD OF THE INVENTION

The present invention relates to a method for determining an operating parameter of an internal combustion engine.

RELATED TECHNOLOGY

The fuel/air ratio (λ) of an Otto engine should be kept constant at λ=1 when catalysts are used for exhaust gas post-treatment. For this purpose, the fuel/air ratio is measured in the exhaust gas using lambda probes.

Measuring the ionic current at the spark plugs of an internal combustion engine has been done. Conventionally, such measurements are used for recognizing misfirings and engine knocking.

German Patent Application No. 35 06 114 A1 describes a method for controlling an internal combustion engine using ionic current measurements. In this method, a measurement spectrum is calculated as a function of the ionic current determined and compared to a reference spectrum using a computer unit, whereupon a manipulated variable of the internal combustion engine is controlled as a function of the deviation determined.

German Patent Application No. 40 37 943 A1 describes the control of the operating state of an internal combustion engine using ionic current measurement. The object of the process described therein, however, is to prevent ignition by incandescence or engine knock.

Furthermore, German Patent Application No. 42 39 592 A1 describes a knock detector for an internal combustion engine, which detects the ionic current across an ignition coil at the time of combustion and evaluates whether or not the ionic current exceeds a predefined level after a predefined period of time or crankshaft angle after ignition. This device is used exclusively to determine knocking.

Additionally, determining the fuel/air ratio from the ionic current signal amplitude has been done. It has been found, however, that with this method the ionic current signal is subject to strong cyclic fluctuations, so that the ionic current maximums must be averaged over a high number of cycles in order to achieve the required lambda measurement accuracy. Due to the errors thus caused in non-steady operation, this procedure is unsuitable as a standard operation. Furthermore, the ionic current amplitude depends on the type of fuel used, so that the fuel type must be recognized in order to determine the actual lambda value.

SUMMARY OF THE INVENTION

An object of the present invention is to provide a method to easily and reliably determine an operating parameter of an internal combustion engine.

The present invention therefore provides a method for determining an operating parameter of an internal combustion engine with the following steps: measure an ionic current signal curve at a spark plug of the internal combustion engine for a number of ignitions as a function of time; average the measured signal curves to obtain an averaged signal curve; obtain the maximum and/or the time of this maximum of the averaged signal curve; and calculate the operating parameter on the basis of the maximum and/or the time of the maximum of the average signal curve.

With the method according to the present invention, engine operating parameters to be set can be determined with sufficient accuracy over relatively short cycles. According to the present invention, a number of cycles of the ionic current signal are measured as a function of time. By averaging these measurements, interferences, in particular submaximums in the ionic current signal, may be eliminated and the actual main maximum and/or the point in time when the main maximum occurs may be determined. On the basis of this data, the respective operating parameters may be determined in a simple manner. In particular, the lambda value may be measured during a cold start. Sensor wear or aging, as occurred with conventional lambda probes, may now be ruled out. With the method according to the present invention, the corresponding operating parameter may be determined regardless of cyclic fluctuations. The aforementioned operating parameters may also be determined in lean operation of the engine.

The operating parameter in question is advantageously the fuel/air ratio λ (lambda ratio) of the internal combustion engine. It has been determined that the time until the first maximum, $I1_{max}$, of the ionic current is reached does not depend on the ionizability of the fuel, but on the turbulent combustion rate. The turbulent combustion rate is in turn dependent on the laminar combustion rate and the turbulence intensity. The laminar combustion rate is determined by the fuel/air ratio λ, the residual gas level, as well as the temperature and pressure of the mixture in the cylinder. Since the temperature and pressure are known from the exhaust gas pressure and time of ignition, the fuel/air ratio λ may be determined for a known exhaust gas recirculation rate.

The exhaust gas recirculation rate can also be determined when the fuel/air ratio is known by taking into account the aforementioned relationships.

The measurements according to the present invention are preferably performed on different cylinders and spark plugs. This makes cylinder-selective determination of the lambda value simple for multicylinder engines.

BRIEF DESCRIPTION OF THE DRAWINGS

Embodiments of the present invention are explained below with reference to the drawings, in which.

DETAILED DESCRIPTION

Figure 1:
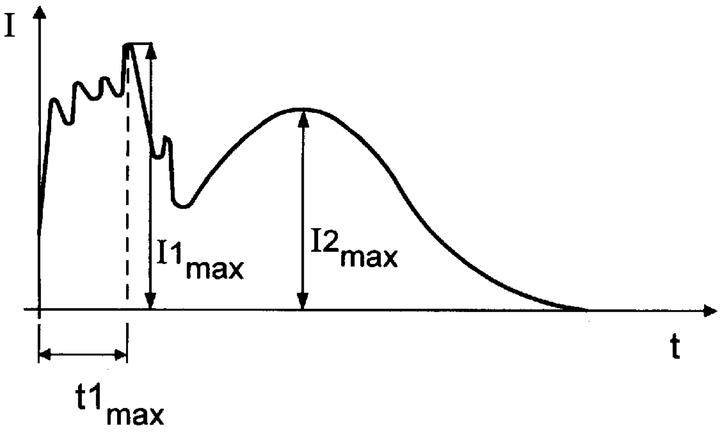
FIG. 1 shows the typical curve of an ionic current signal.

As shown in FIG. 1, an ionic current signal at the spark plug has a characteristic curve, which has two basic maximums. The first maximum $I1_{max}$ appears in the flame core forming phase, when the flame is still in the spark plug area. Ideally the flame propagates in a conic shape in the combustion chamber. However, currents at the spark plug and above all turbulence effects on the flame core result in the flame being fractured. The first maximum $I1_{max}$ of the ionic current signal is therefore not smooth, but has several submaximums. In order to evaluate the first maximum in the ionic current signal, averaging over several cycles, i.e., over a number of ignitions, is therefore necessary. Toward this end, conventionally the absolute maximum is determined for each ionic current signal, i.e., for each ignition. The average is formed from the values thus obtained. In this method, the ionic current maximums must be determined over a very large number of cycles in order to achieve the required λ measurement accuracy due to the great fluctuation range of the absolute maximums.

According to the present invention, the ionic current signal curve is determined over the entire range of the first maximum as a function of time. The signal curves thus determined over several ignitions are then averaged, whereby a smooth signal curve is obtained and the submaximums are eliminated; an average maximum amplitude or the time of the average maximum amplitude can be easily read from this curve. With this method, the number of cycles required to achieve sufficient accuracy can be substantially reduced compared to the conventional method. It is assumed that sufficient accuracy in determining the lambda value is achieved by averaging over as few as 5 to 20 cycles.

It has been determined that the time of the averaged maximum amplitude $t1_{max}$, is a suitable parameter for determining the fuel/air ratio or the exhaust gas recirculation rate with sufficient accuracy for effectively controlling the internal combustion engine.

As explained above, the flame propagation rate and therefore the time between ignition and the first ionic current maximum, $t1_{max}$, depends on the turbulent combustion rate. Also, as explained above, the fuel/air ratio can be determined from $t1_{max}$ when the exhaust gas recirculation rate is known, or the exhaust gas recirculation rate can be determined when the fuel/air ratio is known.

In contrast, $t1_{max}$ is independent of the ionizability of the fuel, the ionizability of the fuel being influenced by the fuel quality and the fuel additives. The amplitude of the first maximum, $I1_{max}$, of the ionic current, however, does not depend only on the fuel/air ratio, but, due to the different ionizabilities of different fuels, also on the fuel quality and fuel additives.

Although it is sufficient to determine the time of the averaged signal maximum in order to determine the above-noted operating parameters, it is advantageous to also calculate the actual value of the maximum at the same time. Although this amplitude value, as mentioned previously, is independent of the fuel used, the slope of the ionic current signal can be calculated by taking into account both the maximum amplitude and the time of the maximum amplitude. Then the fuel/air ratio and the exhaust gas recirculation rate can be easily calculated from this slope, especially when the fuel, the fuel/air ratio, and/or the exhaust gas recirculation rate are known. Based on the signal maximum, or the maximum amplitude, the fuel quality can also be determined, in particular by taking into account the slope, as determined, of the ionic current signal. If the fuel quality is known, the desired operating parameters can also be determined on the basis of the maximum of the averaged signal curve alone.

According to another method according to the present invention, the time of the maximum ionic current value is determined for each of a number of ignitions. Then the times determined for the respective maximums are averaged to obtain an average point in time. On the basis of this averaged time, the operating parameters in question can be determined with sufficient accuracy, as explained previously. This method also provides sufficient accuracy for the operating parameters.

It should be noted that the second maximum $I2_{max}$ that appears in the ionic current shown is produced by an increase in the cylinder pressure due to combustion. At this point, the flame has detached from the spark plug, and electrical conductivity is obtained by the residual ionization of the combustion gases. The second ionic current maximum is smooth, since the influence of flame propagation no longer affects the spark plug. The second maximum $I2_{max}$, however, is irrelevant in this context for determining the fuel/air ratio or the other aforementioned operating parameters.

Figure 2:
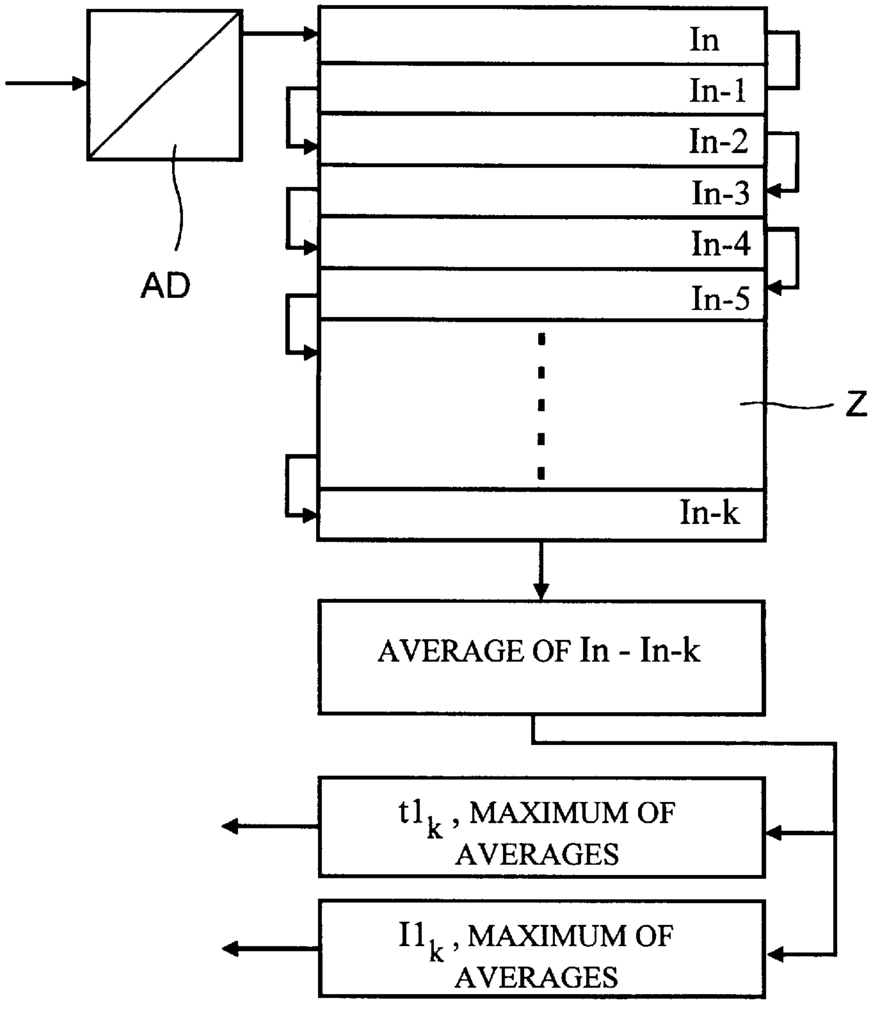
FIG. 2 shows a block diagram of an embodiment of the method according to the present invention.

One embodiment of the method according to the present invention is illustrated in FIG. 2, where the ionic current signal is loaded line-by-line into an intermediate memory Z via an analog-digital converter AD. The intermediate memory is preferably a dynamic memory with shift register function for ionic current signals In to In−k. The intermediate memory has k lines with first-in-first-out (FIFO) function, where ionic current signals are stored. Prior to entering the nth ionic current signal, the previously entered ionic current signals are shifted by one line. After entering the most recent ionic current signal, an average ionic current signal averaged over k lines is calculated for each column. This provides the averaged ionic current signal of the last k cycles. The maximum $I1_{max}$ and/or the time of this maximum $t1_{max}$ are calculated from this average ionic current signal.

What is claimed is:

1. A method for determining an operating parameter of an internal combustion engine comprising:

measuring an ionic current signal curve at a spark plug of the internal combustion engine for a number of ignitions as a function of time so as to obtain a plurality of measured signal curves;

averaging the plurality of measured signal curves to obtain an averaged signal curve;

determining a maximum of the averaged signal curve and/or a time of the maximum of the averaged signal curve; and calculating the operating parameter as a function of the maximum and/or the time of the maximum of the average signal curve.

2. The method according to claim 1 wherein the operating parameter is a fuel/air ratio λ of the internal combustion engine.

3. The method according to claim 1 wherein the operating parameter is an exhaust gas recirculation rate of the internal combustion engine.

4. The method according to claim 1 wherein the measuring is performed at different spark plugs and different cylinders of the internal combustion engine.

* * * * *